Figure 3:
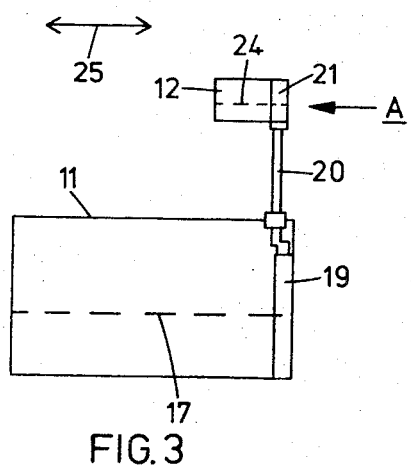

United States Patent [19]
Watson

[11] 3,835,709
[45] Sept. 17, 1974

[54] LIQUID LEVEL INDICATORS

[75] Inventor: Kenneth Watson, Yeovil, England

[73] Assignee: Westland Aircraft Limited, Yeovil, Somerset, England

[22] Filed: Sept. 5, 1972

[21] Appl. No.: 286,322

[52] U.S. Cl............ 73/311, 73/322, 116/118 R, 340/27 R
[51] Int. Cl............ G01f 23/02, G01f 23/10
[58] Field of Search............ 73/306–308, 73/322, 149; 116/118 R; 340/177 R, 244 E

[56] References Cited
UNITED STATES PATENTS

| | | | |
|---|---|---|---|
| 3,113,448 | 12/1963 | Hardway, Jr. et al. | 73/149 X |
| 3,116,711 | 1/1964 | Hardesty | 116/135 |
| 3,136,292 | 6/1964 | Mitchell | 116/118 R X |
| 3,137,168 | 6/1964 | Scully | 116/118 R X |
| 3,237,451 | 3/1966 | Haeff | 73/149 |
| 3,428,074 | 8/1966 | Perren | 116/118 R X |
| 3,691,839 | 9/1972 | Lasher | 116/118 R X |
| R25,208 | 7/1962 | Perkins | 340/244 E |

Primary Examiner—Richard C. Queisser
Assistant Examiner—Daniel M. Yasich
Attorney, Agent, or Firm—Larson, Taylor & Hinds

[57] ABSTRACT

The invention discloses a liquid level indicating means which provides a continuous indication of the level of liquid monitored in a container relative a datum level during attitude changes of the container. A second smaller container has a liquid therein corresponding to the volumetric ratio of the ratio of liquid in the first container. Indicator means for the two containers provide a means to compare the monitored levels. The container may be of non-uniform internal shape.

11 Claims, 7 Drawing Figures

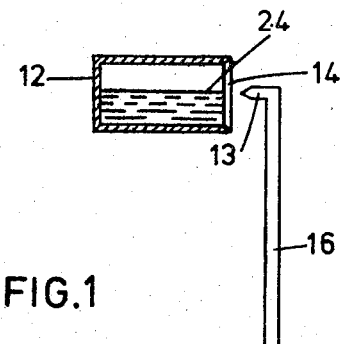
FIG.1
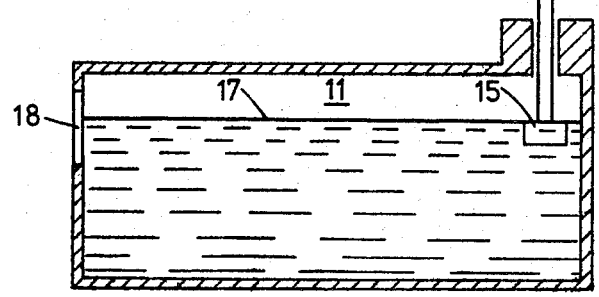
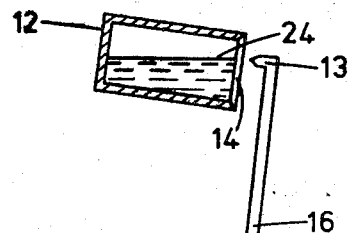
FIG.2
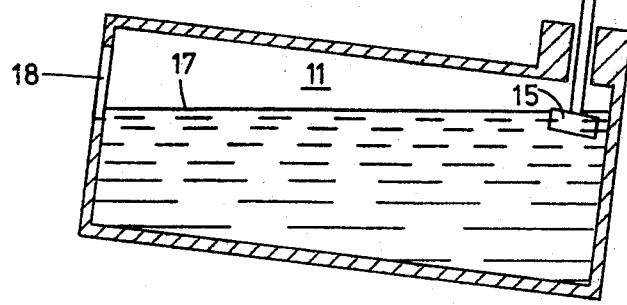

LIQUID LEVEL INDICATORS

THIS INVENTION relates to liquid level indicators.

In installations subject to continuous and sometimes extreme changes of attitude it is often desirable to provide an accurate and continuous indication of a datum level of liquid in a container, for instance a gearbox, regardless of its attitude. This is not possible with conventional systems which can only indicate the continuously changing level of liquid at the precise location of the liquid level responsive means, this level bearing no obvious relationship to the desired datum level. This means that during operation involving continuous attitude changes an operator has no indication of the liquid level in the container relative the desired datum, and could be completely unaware that a loss of liquid had occurred. This problem is aggravated when the container is of a non-uniform shape.

My invention is concerned with the provision of indicating means giving a continuous indication, preferably visual, of the liquid level relative to a datum level in a container, which may be non-uniform, during any normal operational attitude changes of the container, and thus giving an immediate visual indication of any loss of liquid from the container regardless of its attitude. This is accomplished generally by the provision of a second container, preferably of reduced size and having a similar internal shape, and being subject to similar attitude changes as the first container. The second container is provided with liquid to a volumetric ratio corresponding to the ratio of liquid in the first container when the liquid in the first container is at its datum level. The invention relies on the continual monitoring of the liquid level in both containers, preferably at the same relative positions, and the indicating of these levels in a manner in which they can be readily compared. The levels can be indicated in any convenient manner, exemplary ones of which are described and illustrated herein. During attitude changes, the indicated levels from both tanks will move in unison all the time that the amount of liquid in the first container corresponds to that which establishes its datum level with the container at rest. It follows that a separation of the indicated levels, regardless of the actual positions of the indicators on the scales, which positions are governed by the attitude of the containers, then thus constitutes an immediate indication that a loss of liquid has occurred from the first container.

Figure 4:
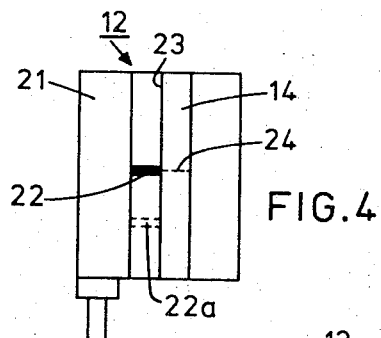
Figure 5:
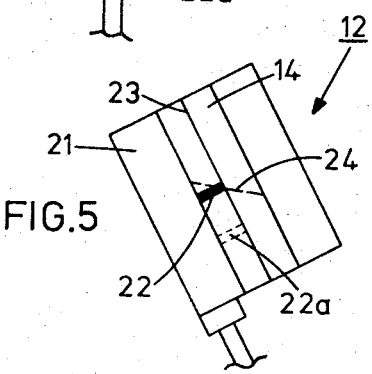
Figure 6:
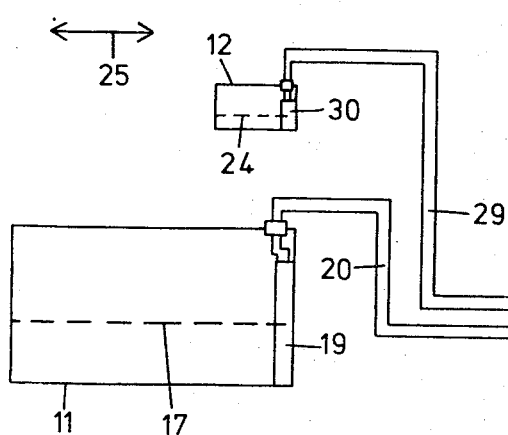
Figure 7:
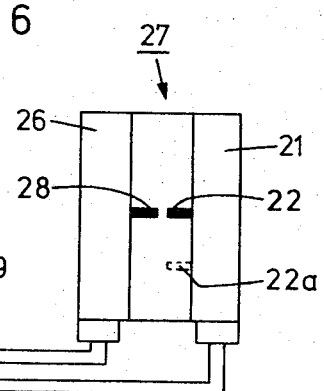
Figure 7:
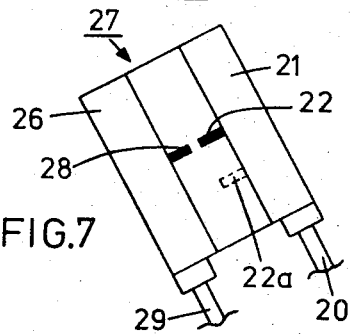

The invention will now be described by way of example only and with reference to the accompanying drawings in which like reference numerals are used to indicate similar parts and in which:

FIGS. 1 and 2 are schematic drawings illustrating the operating principles of the present invention, FIG. 3 is a schematic drawing showing one embodiment of the invention, FIGS. 4 and 5 are detail views of part of FIG. 3, FIG. 6 is a schematic drawing showing a further embodiment of the invention, and FIG. 7 is a further view of part of the embodiment of FIG. 6.

In the drawings, first and second containers 11 and 12 respectively are shown as being of a uniform shape. This is for ease of illustration only, and it is to be understood that the invention is equally effective when used with containers having non-uniform internal shapes.

The second container 12 does not have to be the same size as the first container 11 and as shown in the drawings is advantageously on a smaller scale, however, it is an important feature of the invention that the second container 12 is of the same internal shape.

Referring now to FIG. 1, the first container 11 is filled with a specified amount of liquid which establishes a datum level 17 when the particular installation is static. The datum level 17 is indicated in a sight glass 18, and the specified amount of liquid is calculated to be sufficient to perform its desired function up to the limits of the permissible attitude changes of the installation. As an example, the first container 11 could represent a non-uniform gearbox of a helicopter into which a specified amount of lubricating oil is stored to ensure efficient lubrication of the gearbox throughout the complete range of attitude extremes to which the helicopter can be subjected. When the helicopter is resting on the ground in a static condition the specified amount of oil establishes the datum level 17 as shown in FIG. 1, which can be checked visually through the sight glass 18.

A second container 12 of smaller volume but having the same internal shape as the first container 11, is provided with an amount of liquid so that the ratio between its internal volume and the volume of liquid it contains (volumetric ratio) is the same as the ratio between the internal volume of the first container 11 and the volume of the specified amount of liquid it is desired that the container 11 should hold.

The first and second containers 11 and 12 respectively are located in the particular installation so that their attitudes will always correspond.

It is not essential for the liquids in the two containers to be of similar types.

A float 15 is located in the first container 11 and moves with the changing level of the liquid to move an indicator 13 against a transparent surface 14 in the second container 12 through which the level of liquid 24 in the second container 12 is visible. The float 15 and the transparent surface 14 are located in similar relative positions in their respective containers. A connection 16 between the float 15 and the indicator 13 is arranged so that the indicator 13 corresponds with the level of liquid 24 visible through the transparent surface 14 of the second container 12 when the specified amount of liquid is held by the first container 11, and the installation is in a static position to establish the datum level 17 in the first container 11.

Due to the second container 12 being a volumetric replica of the first container 11 when it contains its specified amount of liquid, the levels indicated by the indicator 13 and through the transparent panel 14 will always correspond, irrespective of the attitudes of the containers 11 and 12. This is illustrated in FIG. 2 in which, although the containers have been tilted rearwardly, the indicated levels still correspond to provide a continuous indication, regardless of attitude, of the state of the liquid level in the container 11 relative the desired datum level 17 established by the specified amount of liquid with the installation in a static condition as shown in FIG. 1.

Should the liquid level in the first container 11 fall below the datum level 17 shown in FIG. 1, this will be immediately apparent by a difference between the indicator 13 and the level visible through the transparent panel 14, irrespective of the attitudes of the containers.

It will be apparent, therefore, that the liquid level indicating means of the present invention gives an immediate indication of any variance of liquid level from a desired datum level in a container, regardless of its attitude.

Referring again to the example previously used, the second container 12 is of a size suitable for incorporation in a helicopter instrument display to provide a pilot with an accurate and continuous indication of the level of lubricating oil in the gearbox relative its desired ground datum level throughout any changes of attitude assumed by the helicopter during its operation. The pilot is made immediately aware of any loss of liquid from the specified amount in the first container 11 by misalignment of the indicator 13 and the liquid level 24 indicated in the transparent surface 14 in the second container 12.

The embodiment of the invention illustrated in FIGS. 3, 4 and 5 is similar to the embodiment previously described, except that the liquid level in the first container 11 is sensed and indicated by electrically operated means.

An electrically operated liquid level responsive means 19 is located in the first container 11 in the same relative position as the transparent panel 14 in the second container 12 shown in FIGS. 4 and 5, which are views on arrow A of FIG. 3. The liquid level responsive means 19 is connected by electrical leads 20 to a strip indicator 21 located on the second container 12 so that an indicating needle 22 is moved generally vertically over the transparent surface 14 of the second container 12 in response to changes of liquid level in the first container 11. A vertical line 23 is marked on the transparent surface 14 to indicate a mean level of liquid in the second container 12 for a purpose to be hereinafter explained.

As before, the second container 12 is a volumetric replica of the first container 11 and the indicating means is calibrated so that with the specified amount of liquid in the first container 11, which establishes the datum level 17 with the installation static, the indicating needle 22 is always aligned with the liquid level 24 in the second container 12 visible through the transparent surface 14, as shown in FIG. 4, regardless of the attitude of the installation.

Changes of attitude of the installation in a fore-and-aft plane, indicated in FIG. 3 by the arrow 25, causes movement of the liquid level in the second container 12 throughout the extent of the transparent surface 14 in a plane generally parallel to the indicating needle 22 (FIG. 4). However, attitude changes in a lateral plane results in the level 24 assuming an angled relationship relative the needle 22, as shown in FIG. 5. In this case the true levels are indicated when the needle 22 intersects the indicated level 24 at the same point as the line 23 marked on the transparent panel 14, which represents the mean level of liquid in the second container 12.

Should the needle 22 take up any other position, for instance, position 22a in FIGS. 4 and 5 regardless of the attitude of the installation, it is an immediate indication of a loss of liquid from the specified amount in the first container 11.

The embodiment of the invention illustrated in FIGS. 6 and 7 is similar to the embodiments previously described, except that the liquid levels in both the first and second containers 11 and 12 are sensed and indicated by electrically operated means. As in the embodiment of FIG. 3, the liquid level in the first container 11 is sensed by an electrically operated liquid level responsive means 19 connected to a strip indicator 21 having a needle 22 movable in response to changes of liquid level in the first container 11. In the embodiment of FIG. 6, a second strip indicator 26 is used to make up a liquid level indicator generally shown at 27, and has a needle 28 movable in response to changes in liquid level in the second container 12. The strip indicator 26 is connected by electrical leads 29 to an electrically operated liquid level responsive means 30 located in the same relative position in the second container 12 as the means 19 in the first container 11. The electrically operated level indicating means 19 and 30 are calibrated so that, with the speicifed amount of liquid in the container 11, the needles 22 and 28 respectively are always aligned in any position throughout the scale of indicator 27, regardless of the attitude of the installation.

In the embodiment of FIG. 6 the needles 22 and 28 remain parallel throughout attitude changes in both the fore-and-aft plane, indicated by the arrows 25, and in a lateral plane as shown in FIG. 7, in which the indicator 27 is tilted laterally. Operation is identical to that previously described in that whilst the needles 22 and 28 are aligned an operator is assured that the specified amount of liquid is contained in the first container 11 regardless of its attitude, changes of which are effective only to cause movement of the aligned needles 22 and 28 about the scale on the indicator 27. An immediate indication of a loss of liquid from the container 11 is provided when the needle 22 moves out of alignment with needle 28, for instance as shown at 22a in FIGS. 6 and 7.

Although several embodiments of the invention have been described and illustrated it is to be understood that various modifications can be made without departing from the scope of the appended claims. For instance, in the embodiment of FIGS. 6 and 7, the two needles 22 and 28 could be incorporated in one indicator, in which case the needles 22 and 28 would be superimposed as long as the specified amount of liquid is contained in the first container 11. It will also be readily apparent to those skilled in the art that the particular type of apparatus used to monitor or indicate the liquid levels is not a feature of the invention, since anyone skilled in the art could put the invention into practice using any one of a number of methods and devices for liquid level indication. Merely as examples, float-operated resistor types could be used, such as shown in U.S. reissue Pat. No. RE. 25,208 or U.S. Pat. No. 3,266,212. The strip indicators referred to herein are well known, and as such do not constitute novel features of this invention, and have been set forth herein merely as examples of appropriate devices for indicating the liquid levels. Various other forms of indicators will be well known to those skilled in the art. Such indicators may include practically any form of indicator member, usually in the form of a needle or needles, it being noted that the "needle" in connection with strip indicators constitutes a generic reference to the indicator member, such as an index line either marked on the strip or provided by the demarkation line between two contrasting colors on the strip, all of which is well known in the art.

I claim as my invention:

1. Liquid level indicating means to indicate the level of liquid in a first container relative to a predetermined datum level therein during attitude changes, comprising a second container in a predetermined relationship to the first container so as to be subject to identical attitude changes, said second container being filled with a liquid to the same volumetric ratio as the volumetric ratio of the first container when the first container is filled to its said datum level, monitoring means for monitoring the liquid levels in the first and second containers, and indicator means for providing a readily discernible comparison of the monitored levels.

2. Liquid level indicating means as claimed in claim 1, wherein the first and second containers have substantially similar internal shapes and orientations.

3. Liquid level indicating means as claimed in claim 2, wherein the monitoring means for monitoring the liquid levels in the first and second containers are located in the same relative positions in the containers.

4. Liquid level indicating means as claimed in claim 3 wherein said second container is at least normally separate from and non-fluid-communicating with said first container such that any leakage from said first container does not affect the liquid level in the second container.

5. Liquid level indicating means as claimed in claim 3, wherein the monitoring means and indicator means for the first and second containers are adapted so that the compared levels assume a known relationship when a specified amount of liquid is contained in the first container to establish the predetermined datum level.

6. Liquid level indicating means as claimed in claim 5, wherein the monitoring means for monitoring the liquid levels in the first and second containers comprise electrically operated liquid level responsive means, and the means for providing a readily discernible comparison of the levels comprise two indicator members connected one to each of the liquid level responsive means and located on a remote indicator for movement in response to changes in liquid levels in the first and second containers.

7. Liquid level indicating means as claimed in claim 5, wherein the monitoring means for monitoring the liquid level in the first container comprises an electrically operated liquid level responsive means, the monitoring means for monitoring the liquid level in the second container comprises a transparent panel in the container, and the means for providing a readily discernible comparison of the levels comprises an indicator operated by the liquid level responsive means for movement over the transparent panel.

8. Liquid level indicating means as claimed in claim 7, wherein a mean liquid level indicating line is marked on the transparent panel of the second container.

9. Liquid level indicating means as claimed in claim 5, wherein the compared levels are aligned when the specified amount of liquid is contained in the first container to establish the predetermined datum level.

10. Liquid level indicating means as claimed in claim 9, wherein the monitoring means for monitoring the liquid level in the first container comprises a float, the monitoring means for monitoring the liquid level in the second container comprises a transparent panel in the container, and the means for providing a readily discernible comparison of the levels comprises an indicator connected to the float for movement over the transparent panel.

11. Liquid level indicating means as claimed in claim 9, wherein the second container is suitably sized and constructed for fitment in an instrument display.

* * * * *